Aug. 28, 1945.　　P. B. WALLACE, SR　　2,383,753
FLANGE FACING TOOL
Filed April 19, 1943
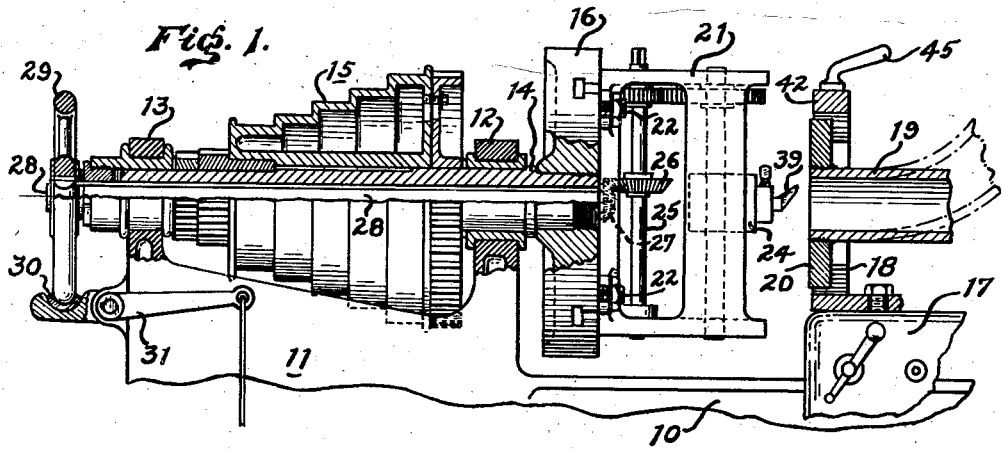
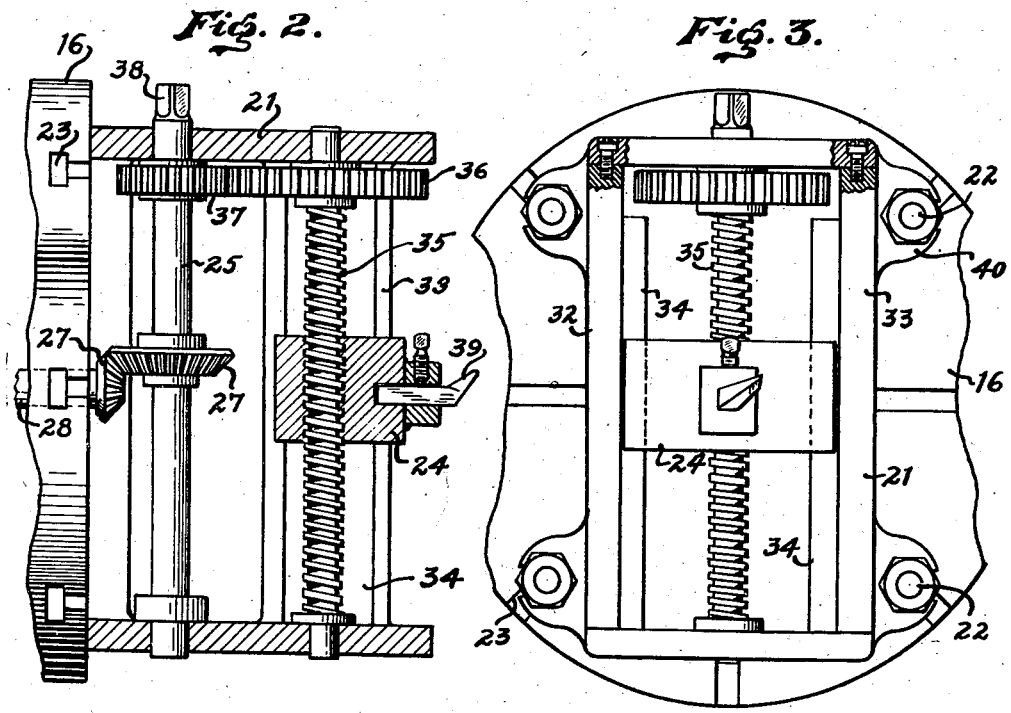
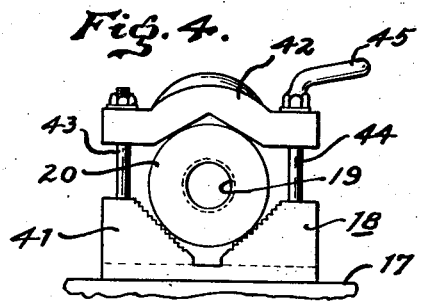
INVENTOR.
PHILIP B. WALLACE, SR.
BY
ATTORNEY Patented Aug. 28, 1945

2,383,753

UNITED STATES PATENT OFFICE 2,383,753

FLANGE FACING TOOL

Philip B. Wallace, Sr., San Francisco, Calif.

Application April 19, 1943, Serial No. 483,547

7 Claims. (Cl. 82—2)

My present invention relates to a tooling attachment for machine lathes of conventional construction, and more particularly to an attachment for adapting a lathe to the operation of facing and machining a metallic surface.

An object of the invention is to provide a simple and improved cutting tool for the face plate of a lathe and by which the lathe may be adapted to the machining of flat surfaces.

Another object of the invention is to provide a tooling attachment for a lathe of conventional construction by which a vertically disposed surface may be machined in a simple and convenient manner.

In the manufacture and fabrication of pipe connections and couplings it has now become common practice to cut and bend the lengths of pipe from rolled pipe stock and to then weld a suitable flange forming annular ring at the ends thereof. This as distinguished from the prior art practice of casting the flange fittings and threading them upon the ends of the pipe. With the former practice it was a simple matter to machine the flanges before assembly so as to provide a proper and right-angled surface upon the flange. However, where the flanges are formed directly by the welding of an annular flange forming member upon the pipe, as above indicated, the problem of properly positioning and welding the flange forming member upon the pipe and also maintaining a right-angled relation between the surface of the flange forming member and the axis of the pipe, has been found to present a difficult and time consuming operation. At present the annular flange forming members are generally welded upon the end of the pipe in a position approximately conforming to the ultimate requirements, and later the flanges so formed are machined off to provide the final surface or gasket engaging face on the flange. However, the performance of this latter operation is often complicated by the nature and shape of the pipe upon which the flange is formed, and more often these pipes are of such a length that the machining of the flanges upon a machine is impossible. It is, therefore, a further object of my present invention to provide a machine tool attachment that may be used with any ordinary lathe to machine or face the flanges secured upon pipe sections of any diameter or length by welding in accordance with ordinary welding practice.

Other objects and advantages of the invention will be in part evident to those skilled in the art and in part pointed out hereinafter in connection with the accompanying drawing, wherein there is shown by way of illustration and not of limitation a preferred embodiment thereof.

In the drawing;

Figure 1 is a fragmentary side elevation of a lathe with parts broken away and showing a device constructed in accordance with my invention as associated therewith, Figure 2 is a side view in section showing the details of construction of my improved device, Figure 3 is a front view of the device showing other details and the manner of attaching the same to the face plate of a lathe, and Figure 4 is a fragmentary view showing a form of clamping means by which work may be held when operated upon by a cutting tool of the device illustrated and described.

Reference is now made to Figure 1 of the drawing wherein the device constructed in accordance with this invention is shown as mounted upon and carried by the head stock of a lathe in associated relation with work secured upon the lathe tool carriage. In this figure of the drawing the numeral 10 designates the bed of a lathe having a head stock 11 with upstanding bearing pedestals 12 and 13 in which a hollow or tubular spindle 14 is journaled. The lathe is shown as having the conventional nest of cone pulleys and back gears, designated generally by the numeral 15, by which the spindle 14 is driven in the well known manner. At its outer end the hollow spindle 14 carries a face plate 16 which is likewise of conventional design. The tool carriage of the lathe, designated by the numeral 17, is shown as provided with a suitable work supporting vise 18 in which a pipe section 19 having a flange 20 is shown as secured with the surface of the flange 20 disposed in substantially parallel relation to the face of the face plate 16. It will be understood that the above described elements, except for the vise 18, are to be found in any conventional lathe and, therefore, form no part of the present invention, except insofar as these parts cooperate with the elements to be now described. In accordance with the preferred form of the invention, the face plate 16 carries an open frame 21 that is adapted to be firmly secured upon the face plate 16 by means of bolts 22 which engage with T-slots 23 formed in the face plate 16. The frame 21, as will be hereinafter described in more detail, has a movable tool supporting member 24 that is adapted to move transverse to the axis of the lathe spindle 14 when in operation, and for this purpose the frame 21 carries a driving shaft 25 upon which there is a beveled gear 26 that meshes with a beveled pinion or gear 27 secured upon the end of a rearwardly extending and free floating shaft 28. This free floating shaft 28 is disposed within the hollow spindle 14 of the lathe and it carries a hand wheel 29 at its outer end. Associated with the hand wheel 29 there is also shown a brake shoe 30 which, when operated by a lever 31, is adapted to stop or retard any rotation of the free floating shaft 28 when the device is in operation, as will be hereinafter described.

Upon now referring to Figures 2 and 3 of the drawing, it will be seen that the frame 21 is of open rectangular construction and that it has spaced parallel extending side portions 32 and 33 that carry two guide rails 34 between which the tool supporting member 24 is slidably mounted. Extending through and threaded within the tool supporting member 24 there is a lead screw 35 that is journaled in the end portions of the frame 21. This lead screw 35 has a driving gear 36 that meshes with a smaller pinion gear 37 carried by the driving shaft 25. The driving shaft 25 is also here shown as having a squared end 38 by means of which the position of a tool 39 carried by the tool supporting member 24 may be manually adjusted in setting up and starting the work. As is more clearly shown in Figure 3 of the drawing, the frame 21 has outwardly extending ears 40 at its four corners through which the bolts 22 are adapted to pass when the device is mounted upon the face plate 16 of the lathe.

In Figure 4 of the drawing the work supporting and holding vise 18 is shown as of the V-block type. The flange 20 of the pipe 19 is preferably gripped at its outer perimeter between the serrated surfaces of a V-block 41 and a clamping member 42 which is held in position by tie-bolts 43 and 44 that are adapted to be tightened and released by means of a lever nut 45.

With the device constructed as above described, it will be seen that when the work has been positioned in cutting relation with the tool 39, and the face plate 16 together with the frame 21 is rotated, the back gearing and friction occasioned by the particular driving gear arrangement between the beveled pinion gear 27 at the inner end of the free floating shaft 28 and the lead screw 35 will be such as to cause the free floating shaft 28 to rotate with the hollow spindle 14 of the lathe and, as a result, no traversing movement of the tool supporting member 24 will occur. However, if a slight pressure or retarding force is applied to the hand wheel 29, it will be seen that a relative angular displacement will occur between the hollow spindle 14 of the lathe and the free floating shaft 28 and, as a result of this displacement, a relative turning movement will be imparted to the beveled gear 26 upon the driving shaft 25 and, as this movement is transmitted through the gears 36 and 37 to the lead screw 35, the tool supporting member 24 will be caused to move radially with respect to the axis of the hollow spindle 14 of the lathe. Therefore, if it is desired to merely adjust the position of the cutting tool with respect to any previous position, the operator can accomplish this by simply stopping the rotation of the free floating shaft 28 by the application of a stopping or retarding force to the hand wheel 29 for a relatively short period of time. On the other hand, if it is desired to obtain a substantially progressive feed of the cutting tool 39 across the work, this may be accomplished by applying a continuous braking force upon the hand wheel 29. In this latter operation the lever 31 can be used to bring the brake shoe 30 into sufficient frictional engagement with the hand wheel 29 to substantially uniformly retard the rotation of the free floating shaft 28 and thus establish any desired relative rotation between this shaft and the spindle 14 of the lathe. Where it is desired to provide for a definite and substantially uniform rate of travel of the cutting tool 39, this may be accomplished by providing a ratio of reduction in the gear drive between the lead screw 35 and the pinion gear 27 which, when the free floating shaft 28 is held stationary, as by means of the brake shoe 30, will produce the required travel of the tool supporting member 24 with respect to the work. In setting up the work, the operator will be able to adjust the tool supporting member 24, together with the cutting tool 39, to any cutting position by merely turning the driving shaft 25 through the medium of a crank or wrench applied to the squared end 38 of this shaft.

While I have, for the sake of clearness and in order to disclose the invention so that the same can be readily understood, described and illustrated specific devices and arrangements, I desire to have it understood that this invention is not necessarily limited to the specific means disclosed, but may be embodied in other ways that will suggest themselves to persons skilled in the art. For example, it is contemplated that instead of mounting the device upon the face of a lathe, it might well be mounted upon the tool supporting head of a milling or other type of machine which can be moved toward the work while the latter is supported in a fixed position. It is believed that this invention is new and it is desired to claim it so that all such changes as come wtihin the scope of the appended claims are to be considered as part of this invention.

Having thus described my invention, what I claim and desire to secure by Letters Patent is:

1. In a surface facing tool for use upon a lathe of conventional design having a head stock with hollow spindle and face plate carried thereby, the combination of a frame adapted to be secured upon said face plate, a tool support having a cutting tool mounted upon said frame to move diametrically with respect to the axis of said face plate, a lead screw carried by said frame for controlling the diametrical movement of said tool support, a free floating shaft extending through and adapted to turn with the hollow spindle of the lathe having a gear at one end thereof adjacent said frame, a hand wheel carried by the other end of said free floating shaft for retarding and/or stopping rotation thereof as said face plate is rotated, and a driving connection between the lead screw carried by said frame and said free floating shaft, whereby said lead screw will be turned relative to said frame and cause said tool support to move radially with respect to the axis of said face plate when said hand wheel is held against rotation.

2. In a surface facing tool for use upon a lathe of conventional design having a head stock with hollow spindle and face plate carried thereby, the combination of a frame adapted to be secured upon said face plate, a tool support having a cutting tool mounted upon said frame to move diametrically with respect to the axis of said face plate, a lead screw carried by said frame for controlling the diametrical movement of said tool support, a free floating shaft extending through and turnable with the hollow spindle of the lathe having a gear at one end thereof adjacent said frame, a hand wheel carried by the other end of said free floating shaft, a driving connection between the lead screw carried by said frame and said free floating shaft, whereby said lead screw may be rotated relative to said frame and cause said tool support to move radially with respect to the axis of said face plate, and a friction brake shoe operatively associated with said hand wheel for stopping and retarding rotation thereof as the spindle of the lathe turns.

3. In a surface facing tool for use upon a lathe of conventional design having a head stock with hollow spindle and face plate carried thereby, the combination of a frame adapted to be secured upon the surface of the lathe face plate, a tool support having an outwardly extending cutting tool mounted in said frame to move diametrically with respect to the axis of the lathe spindle, a lead screw for controlling the diametrical movement of said tool support, a driving shaft for said lead screw and having a driving gear intermediate its ends, a free floating shaft extending through and adapted to turn freely with the hollow spindle of the lathe, a gear at the end of said free floating shaft meshing with the gear upon said driving shaft, a driving connection between said lead screw and said driving shaft, and a hand wheel at the outer end of said free floating shaft adapted when gripped by an operator to retard and/or stop rotation of said free floating shaft within said spindle, whereby said driving shaft will rotate said lead screw and cause said tool support and cutting tool to move radially with respect to the axis of said face plate.

4. In a surface facing tool for use upon a lathe of conventional design having a head stock with hollow spindle and face plate carried thereby, the combination of a frame adapted to be secured upon said face plate, a tool support having a cutting tool mounted in said frame to move diametrically with respect to the axis of said face plate, a lead screw for controlling the diametrical movement of said tool support, a driving shaft for said lead screw having a driving gear intermediate its ends, a free floating shaft extending through and adapted to turn with the hollow spindle of the lathe having a gear at the inner end thereof meshing with the gear upon said driving shaft, a driving connection between said lead screw and said driving shaft, and a brake means associated with the outer end of said free floating shaft for retarding and/or stopping rotation thereof as said face plate and frame rotate, whereby the gear at the inner end thereof will impart relative rotation to said driving gear and cause said tool support with said cutting tool to move radially with respect to the axis of said face plate.

5. In a flange facing tool for a lathe of the type having a hollow driving spindle and a face plate driven by said spindle, the combination of a supporting frame adapted to be secured in an outwardly disposed position upon the face plate of the lathe, a cutting tool slidably mounted upon said supporting frame and adapted to move transversely with respect to the axis of said face plate, a lead screw for controlling the transverse movement of said cutting tool, a driving shaft carried by said supporting frame disposed adjacent said face plate and having a driving gear intermediate its ends, a free floating shaft extending through and adapted to turn with said hollow spindle having a gear at one end with which the gear upon said driving shaft engages, brake means at the outer end of said free floating shaft for stopping and/or retarding rotation thereof as said hollow spindle and said face plate rotate, and a driving connection between said free floating shaft and said lead screw adapted to impart a traversing movement to said cutting tool as said frame turns with the face plate of the lathe.

6. A flange facing tool for use upon a lathe of the type having a hollow driving spindle and a face plate mounted upon and driven by said spindle, the combination of a supporting frame adapted to be secured upon said face plate, a cutting tool slidably mounted upon said supporting frame and adapted to move transversely with respect to the axis of said face plate, a lead screw for controlling the transverse movement of said cutting tool, a free floating shaft extending through and adapted to normally turn with the hollow spindle of the lathe, a gear at the face plate end of said free floating shaft, a driving connection between said lead screw and the gear at the end of said free floating shaft adapted to impart a traversing movement to said cutting tool as said supporting frame turns with said face plate, and brake means at the outer end of said free floating shaft for stopping and/or retarding rotation thereof as said hollow spindle and said face plate rotate, whereby the traversing movement of said cutting tool will be determined by the relative speed between said free floating shaft and said hollow spindle.

7. A pipe flange facing tool for use upon a lathe of the type having a hollow driving spindle and a face plate mounted upon and driven by said spindle, the combination of a supporting frame adapted to be secured upon said face plate, a cutting tool slidably mounted upon said supporting frame and adapted to move transversely with respect to the axis of said face plate, a lead screw for controlling the transverse movement of said cutting tool, a free floating shaft extending through and normally turning with the hollow spindle of the lathe, a gear at the face plate end of said free floating shaft, a geared connection between said lead screw and the gear at the end of said free floating shaft adapted to impart a traversing movement to said cutting tool as said supporting frame turns with said face plate, and friction brake means at the other end of said free floating shaft for stopping and/or retarding rotation thereof as said hollow spindle and said face plate rotate, whereby the traversing movement of said cutting tool will be determined by the relative speed between said free floating shaft and said hollow spindle.

PHILIP B. WALLACE, Sr.